United States Patent
Küpper et al.

(10) Patent No.: US 7,442,277 B2
(45) Date of Patent: Oct. 28, 2008

(54) PROCESS FOR THE REMOVAL OF VOLATILE COMPOUNDS FROM MIXTURES OF SUBSTANCES USING A MICRO-EVAPORATOR

(75) Inventors: Kurt-Manfred Küpper, Leverkusen (DE); Oswald Wilmes, Köln (DE); Hartmut Steenbeck, Köln (DE); Almut Nagel, Leverkusen (DE)

(73) Assignee: Bayer MaterialScience LLC, Leverkusen (DE)

( * ) Notice: Subject to any disclaimer, the term of this patent is extended or adjusted under 35 U.S.C. 154(b) by 737 days.

(21) Appl. No.: 10/897,854

(22) Filed: Jul. 23, 2004

(65) Prior Publication Data

US 2005/0022940 A1   Feb. 3, 2005

(30) Foreign Application Priority Data

Aug. 2, 2003  (DE) ................ 103 35 451

(51) Int. Cl.
*B01D 1/30* (2006.01)
*B01J 19/00* (2006.01)
*F28D 15/00* (2006.01)
*B01D 1/00* (2006.01)

(52) U.S. Cl. ............. 159/47.1; 159/44; 165/104.17; 165/911; 422/198; 422/243; 422/255

(58) Field of Classification Search ........... 159/44, 159/47.1; 165/104.17, 911; 422/198, 243, 422/255

See application file for complete search history.

(56) References Cited

U.S. PATENT DOCUMENTS

| 6,200,536 B1 * | 3/2001 | Tonkovich et al. ......... 422/177 |
| 2002/0102762 A1 * | 8/2002 | Huang et al. ................ 438/49 |
| 2005/0279491 A1 * | 12/2005 | Thome et al. .............. 165/272 |

FOREIGN PATENT DOCUMENTS

| DE | 100 10 400 | 9/2001 |
| WO | 01/65194 | 9/2001 |
| WO | 01/65194 A1 * | 9/2001 |
| WO | 2006/108796 A * | 10/2006 |

OTHER PUBLICATIONS

Microscale Thermophysical Engineering 1, (month unavailable) 1997, pp. 321-332, M. Kevin Drost et al, "Microchannel Combustor/Evaporator Thermal Processes".

Ehrfeld W. et al: "Anwendungspotentiale Chemische und Biologischer Mikroreaktoren" Jahrbuch Verfahrenstechnik und Chemieingeniurese, XX, XX, Bd. 69 Nr. 7, 1997, Seiten 102-116, XP000942778.

* cited by examiner

*Primary Examiner*—Virginia Manoharan
(74) *Attorney, Agent, or Firm*—Noland J. Cheung; Robert S. Klemz

(57) ABSTRACT

A process for the removal of at least one volatile compound from a reactive or unreactive mixture of substances with the aid of at least one micro-evaporator, the micro-evaporator displaying channels for carrying the mixture of substances having a hydraulic diameter of 5 to 1000 µm and a specific evaporator surface area of at least $10^3$ m$^2$/m$^3$.

19 Claims, 1 Drawing Sheet

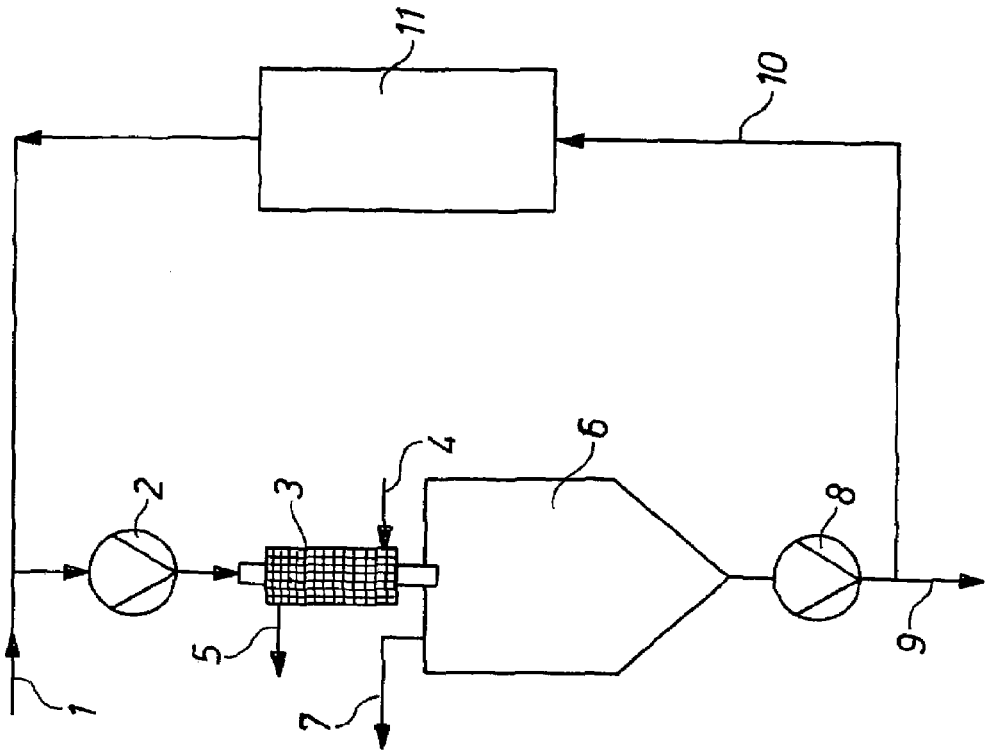
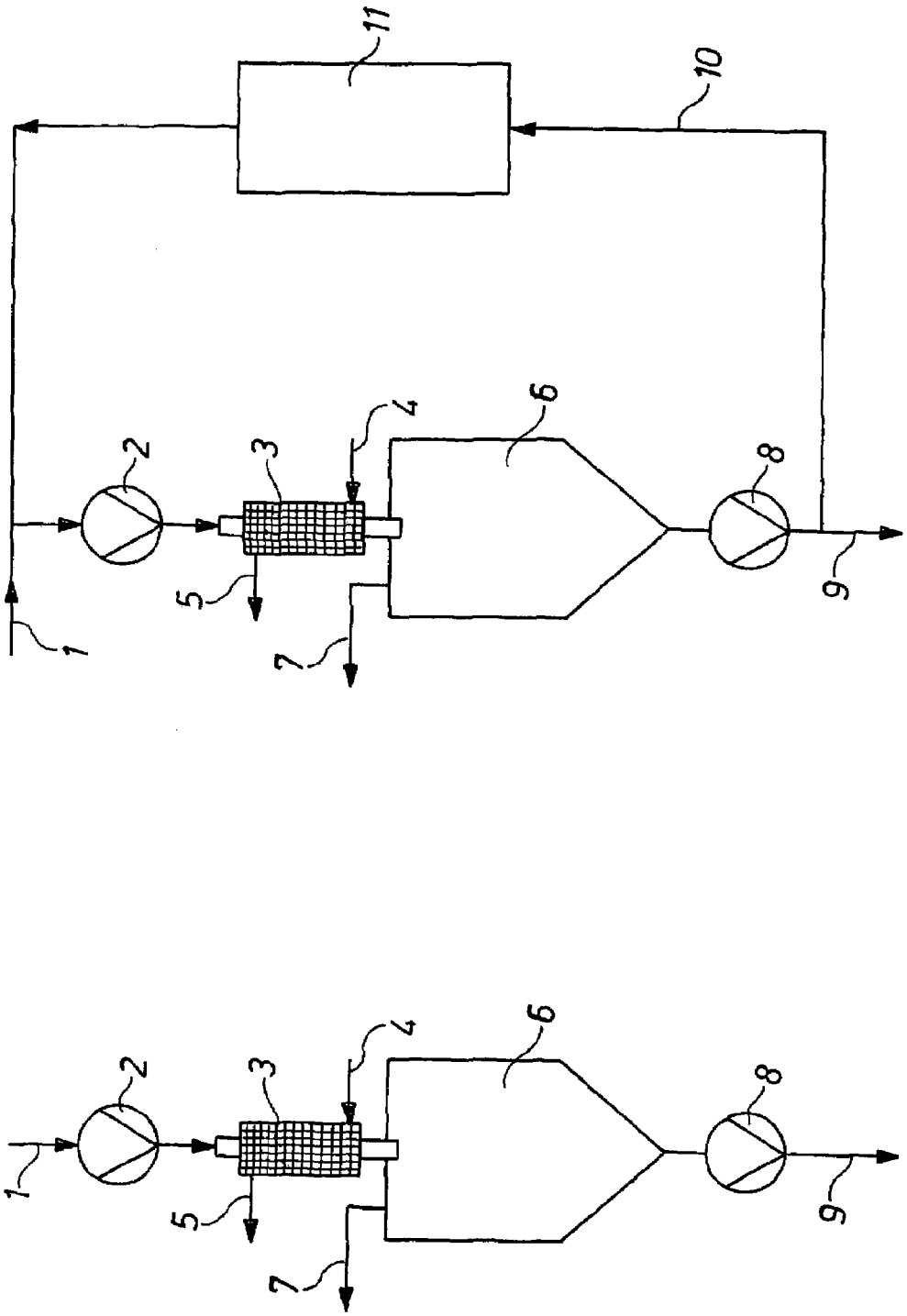

PROCESS FOR THE REMOVAL OF VOLATILE COMPOUNDS FROM MIXTURES OF SUBSTANCES USING A MICRO-EVAPORATOR

CROSS REFERENCE TO RELATED PATENT APPLICATION

The present patent application claims the right of priority under 35 U.S.C. § 119 (a)-(d) of German Patent Application No. 103 35 451.4, filed Aug. 2, 2003.

BACKGROUND OF THE INVENTION

1. Field of the Invention

The invention concerns a process for the removal of volatile compounds from reactive or unreactive mixtures of substances.

2. Description of the Prior Art

Film evaporators are conventionally used in industry for evaporating volatile substances from unreactive, heat-sensitive mixtures of substances. Examples include helical coil-type evaporators, falling-film evaporators and centrifugal evaporators. In helical coil-type evaporators the product is often overheated, especially if the evaporator is operated with a pressure maintained at the outlet. In falling-film or centrifugal evaporators, relatively large film thicknesses of up to 1 mm and up to 0.1 mm respectively are achieved, which have an unfavourable influence on mass and heat transfer and thus require a longer residence time.

A microstructured evaporator coupled to a ceramic combustion chamber, the microstructured evaporator intensifying the heat transfer from the combustion products to the surfaces of the combustion chamber, is known from M. K. Drost, Ch. Call, J. Cuta, R. Wegeng, Microchannel combustor/evaporator thermal processes, Microscale Thermophysical Engineering, 1:321-332, 1997. Microstructured evaporators for evaporating volatile compounds from multicomponent mixtures having an evaporating efficiency in the region of several kg/h or more are not described therein.

The object underlying the invention is to remove volatile substances from mixtures of substances which under operating conditions are of low viscosity, under gentle conditions, i.e. at the lowest temperature, with the shortest residence time and with the narrowest residence time distribution possible.

SUMMARY OF THE INVENTION

The present invention is directed to a process for the removal of at least one volatile compound from a reactive or unreactive mixture of substances with the aid of at least one micro-evaporator, the micro-evaporator displaying channels for carrying the mixture of substances having a hydraulic diameter of 5 to 1000 µm and a specific evaporator surface area of at least $10^3$ m$^2$/m$^3$.

DESCRIPTION OF THE DRAWINGS

FIG. 1 shows a flow chart for a first embodiment of the process according to the invention for the evaporation of volatile compounds from an unreactive mixture of substances; and FIG. 2 shows a flow chart for a second embodiment of the process according to the invention for the evaporation of volatile compounds from a reactive mixture of substances.

DETAILED DESCRIPTION OF THE INVENTION

Other than in the operating examples, or where otherwise indicated, all numbers or expressions referring to quantities of ingredients, reaction conditions, etc. used in the specification and claims are to be understood as modified in all instances by the term "about."

The invention provides a process for the removal of at least one volatile compound from a reactive or unreactive mixture of substances with the aid of at least one micro-evaporator, the micro-evaporator displaying channels for carrying the mixture of substances having a hydraulic diameter of 5 to 1000 µm and a specific evaporator surface area of at least $10^3$ m$^2$/m$^3$.

In a preferred embodiment the channels in the micro-evaporator display a hydraulic diameter of 30 to 500 µm.

In a further preferred embodiment, the channels for carrying the heating medium also display a hydraulic diameter of 5 to 1000 µm, particularly preferably 30 to 500 µm.

The channels in the micro-evaporator for conveying the mixture of substances and the heating medium can display any geometrical form. The cross-section of the channels can for example be circular, semicircular, angular, in particular rectangular or triangular. Regardless of the geometry of the channels, the hydraulic diameter is used as the characterising quantity within the meaning of the present invention. The hydraulic diameter is given by four times the cross-sectional area (A) divided by the circumference (C) of the cross-section:

$$\text{Hydraulic diameter} = 4\,A/C$$

Due to the very small dimensions of the flow channels, heat and mass transfers take place more quickly and more efficiently in microstructured evaporators than in conventional evaporators such as falling-film evaporators and the like. A micro-evaporator within the meaning of the present invention has a specific evaporator surface area of at least $10^3$ m$^2$/m$^3$. Non-microstructured evaporators, e.g. falling-film evaporators, conventionally have a specific evaporator surface area of less than $0.5 \cdot 10^3$ m$^2$/m$^3$. The specific evaporator surface area is given by the ratio of heat transfer surface area to useful volume of the evaporator. In conventional, i.e. non-microstructured, and microstructured evaporators the useful volume is given in turn by the total volume less the volume of the internal fittings.

By the process according to the invention the mixture of substances enters the microstructured evaporator in liquid form. The supply of heat allows volatile components to evaporate, and the mixture of substances is discharged from the outlet of the micro-evaporator as a two-phase gas/liquid mixture. The short residence time means that the evaporation takes place gently, i.e. the more readily volatile substances in the mixture of substances boil with as little overheating as possible. Readily volatile components within the meaning of the present invention are characterised in that under the operating conditions they evaporate partially or completely in the micro-evaporator or at the outlet of the micro-evaporator.

In the channels of the microstructured evaporator a two-phase flow is formed during evaporation, consisting of vapour bubbles whose maximum size is limited by the channel dimensions. This produces a high phase interface, which allows a rapid conversion of the volatile substances to the gas phase and hence ensures a high evaporation rate with short residence times. Furthermore, due to eddy formation within the surrounding liquid phase, the flow of bubbles forming in the channels provides an elevated mass transfer to the phase interface and an elevated heat transfer from the channel wall to the liquid phase.

At operating temperatures of −100 to 500° C., preferably 0 to 400° C., particularly preferably 50 to 250° C., typical viscosities of the mixtures of substances treated by the process according to the invention are a maximum of 5 Pa·s, preferably a maximum of 100 mPa·s.

The temperature in the process according to the invention is preferably −100 to 500° C., preferably 0 to 400° C., particularly preferably 50 to 250° C. The pressure is preferably 0 to 100 bar, particularly preferably 0 to 10 bar, most particularly preferably 0 to 1 bar. The residence time is preferably 0.001 to 60 s, particularly preferably 0.01 to 10 s.

A micro-evaporator such as can be used by the process according to the invention has a layered structure, for example, consisting of thin metal plates, each plate displaying a large number of parallel channels. The plates are arranged crossways to one another, for example, such that the channels in one plate are perpendicular to the channels in the plate below and/or above it. Correspondingly, the heat transfer medium and the mixture of substances are guided through the micro-evaporator in a cross-flow principle: the heating medium and the mixture of substances flow through alternate layers. The plates have a thickness of 100 to 1000 μm, for example. The channels have a length of 0.5 to 20 cm, for example, preferably 1 to 10 cm, and a preferred hydraulic diameter of 5 to 1000 μm, particularly preferably 30 to 500 μm.

The conventional heating media, such as-e.g. steam, pressurised water or heat transfer oils, can be used as the heating medium.

The microstructured evaporator can be manufactured from any metallic material, e.g. steel, stainless steel, titanium, Hastelloy, Inconel or other metallic alloys.

The process can be integrated as an additional process step into a continuous process. It can also be used as an additional process step in a batchwise process by repeated recirculation of a circulating flow to concentrate the desired product or alternatively to shift a chemical equilibrium. The process can for example be integrated as an evaporation stage into any process in the chemical or pharmaceutical industry or in the food industry.

The process can be carried out in one stage or several stages, by arranging multiple microstructured evaporators in series. In a multistage process the evaporation can also be performed at different pressure and temperature levels.

The process according to the invention is used with reactive or unreactive mixtures of substances. Reactive mixtures of substances within the meaning of the present invention are understood to be mixtures of substances containing components that react with one another. Readily volatile components of such mixtures of substances can for example be low-molecular-weight by-products of the reaction or solvents in which the reaction components are dissolved. Unreactive mixtures of substances within the meaning of the present invention on the other hand are understood to be mixtures of substances whose components do not react with one another. The readily volatile components contained in such mixtures of substances can likewise be solvents or low-molecular-weight by-products, for example.

Examples of processes for evaporating volatile components from reactive mixtures of substances that can be cited include: separation of water or other low-molecular-weight substances in polycondensation reactions, e.g. in the production of esters, oligoesters, polyesters or polyamides; phenol separation in the condensation of diphenyl carbonate with aromatic bisphenols to oligomers or polymers; reactions with formation of a separable component having high vapour pressure (for example HCl separation in the reaction of phosgene with alcohols to dialkyl carbonates); pyrolysis reactions in which volatile useful products are produced under pyrolysis conditions, e.g. the separation of polyesters back into macrocyclic monolactones or dilactones; pyrolysis reactions in which a reactive gaseous component is produced from the useful product under pyrolysis conditions and is separated, e.g. separation of gaseous alcohol from an isocyanate which is produced as a condensate in the pyrolysis of urethanes.

Examples of processes for evaporating volatile components from unreactive mixtures of substances that can be cited include: separation of volatile monomers (diisocyanates) from polyisocyanate resins; gentle solvent removal from mixtures of substances having heat-sensitive substances (in particular in fine chemistry); solvent and monomer separation from polymer solutions; separation of volatile useful products from e.g. distillation residues; separation of ethanol from alcoholic drinks. Applications in low-temperature engineering are also possible.

The advantage of the process according to the invention is that because of the short residence times and hence lower heat exposure in the micro-evaporator, decomposition of heat-sensitive products in this processing step is reduced in comparison to conventional evaporators or even avoided altogether. A higher yield and higher product quality are therefore assured. Furthermore, the geometry-induced formation of small bubbles increases the surface-to-volume ratio, as a consequence of which a very efficient evaporation is possible. This is especially important in the removal of residual solvents or residual monomers from polymers, for example.

The use of micro-evaporators for the evaporation of volatile components is advantageous with reactive mixtures of substances too, since the reaction equilibrium can be shifted towards the desired product, thereby increasing the yield.

The compact design of microstructured evaporators means that space requirements and acquisition costs for performing the process are low.

The process according to the invention can be used in particular for separating monomeric diisocyanates from polyisocyanates, which are used for example in polyurethane coating systems. Diisocyanates are conventionally classed as toxic working substances and in some cases display a considerable vapour pressure. For health and safety reasons they must therefore not be present in paint systems in monomeric form. They must first be converted into higher-molecular-weight, non-toxic polyisocyanates by means of suitable modification reactions. This conversion is usually performed with a diisocyanate excess. Residues of unreacted monomeric diisocyanate are removed from the reaction mixture by distillation.

What is substantial here is that the lowest possible residual content of monomeric, i.e. toxic, diisocyanate is contained in the polyisocyanate after distillation. With the process according to the invention, separation of the monomeric diisocyanates is achieved down to the desired residual contents of below 0.5%, in certain cases even down to below 0.1%. The advantage here is that due to the short residence time and narrow residence time distribution the polyisocyanates experience only relatively low heat exposure. Secondary reactions of the isocyanate groups during distillation are avoided in this way and, in addition, particularly light-coloured polyisocyanates are obtained.

FIG. 1 shows a flow chart for the evaporation of volatile components from an unreactive mixture of substances. The liquid mixture of substances is conveyed through an educt feed inlet 1 by means of a pump 2 into the micro-evaporator 3. The microstructured evaporator 3 consists of a large number of parallel channels, which are arranged in layers. The mixture of substances is carried through every second layer of the micro-evaporator 3. Arranged in the layers in between them are likewise a large number of parallel channels, in which the heating medium is carried. The channels for the educt and the heating medium can run parallel to one another or perpendicular to one another, for example. The heating medium is introduced from a heating medium circuit, not shown here, through an inlet 4 and removed from an outlet 5. The mixture of substances flows out of the micro-evaporator 3 as a gas/liquid mixture into a gas separator 6, from which the volatile substances are removed in gaseous form 7. From this gas separator 6 the product 9 is carried out of the installation by a pump 8.

FIG. 2 shows a flow chart for the evaporation of volatile components from reactive mixtures of substances. The liquid mixture of substances (educt) is conveyed through an educt feed inlet 1 into the evaporator by means of a pump 2. The design of the microstructured evaporator 3 is similar for example to that described in FIG. 1. As in FIG. 1, the heating medium is introduced 4 from a heating medium circuit not shown here and removed 5. The mixture of substances flows out of the micro-evaporator 3 as a gas/liquid mixture into a gas separator 6, from which the volatile substances are removed in gaseous form 7. From this gas separator 6 the product 9 is carried out of the installation by a pump 8. Part of this product flow is optionally carried in a circuit 10 through a reactor 11 and returned by the pump 2 to the micro-evaporator 3.

EXAMPLES

A crude product was produced as described below, from which the diisocyanate Desmodur W® ($H_{12}$-MDI, commercial product from Bayer, NCO content 32.1 wt. %) was separated by evaporation:

1586.0 kg of Desmodur W® were placed in an agitated tank under a nitrogen atmosphere. The contents were heated to 60° C. with stirring and 21.5 kg of a propylene oxide polyether having a hydroxyl value of 385 started on 1,1,1-trimethylol propane, 92.6 kg of a propylene oxide polyether having a hydroxyl value of 200 started on bisphenol A and 1470.0 kg of a propylene oxide/ethylene oxide polyether having a hydroxyl value of 28 (ratio of propylene oxide:ethylene oxide=82.5:17.5) started on 1,1,1-trimethylol propane were added one after another at a controlled temperature in the range from 60 to 80° C. The mixture was then heated to 100° C. and reacted until an NCO content of 14.1 wt. % was obtained. The crude product, which still contained approximately 40 wt. % Desmodur W®, was cooled to 50° C.

Example 1

The crude product was supplied at a temperature of 60° C. and a feed rate of 60 kg/h to the microstructured evaporator 3 heated with 30 bar steam (230° C.) and having a deflecting separator 6 connected in series. The microstructured evaporator 3 had the following channel dimensions: length×width×height: 40 mm×200 μm×100 μm. The hydraulic diameter was 133 μm. The heat transfer surface area was 0.135 $m^2$, the specific evaporator surface area $2 \cdot 10^4$ $m^2/m^3$. The residence time in the microstructured evaporator 3 was approximately 0.3 s. 21 kg/h of distillate (Desmodur W®) were separated off in this stage through the deflecting separator 6 under a pressure of 0.8 mbar. The crude product concentrated in this way to a Desmodur W® content of 7.8 wt. % was then transferred to a film evaporator (evaporator surface area 1 $m^2$) heated to 230° C., which was operated under a pressure of 0.5 mbar. At the outlet from the film evaporator a polyisocyanate resin was obtained with an NCO content of 2.55 wt. %, which contained only a residual content of 0.12 wt. % of the Desmodur W® that was used.

Example 2

Comparative Example

The crude product was supplied at a temperature of 60° C. through a line concurrently heated with 6 bar steam (160° C.) at a feed rate of 30 kg/h to a falling-film evaporator with a deflecting separator connected in series. The heat transfer surface area was 0.314 $m^2$, the specific evaporator surface area was $1.57 \cdot 10^2$ $m^2/m^3$. Evaporator and separator were heated with 30 bar steam to 230° C. Distillation took place under 0.8 mbar. A distillate quantity of 9 kg/h Desmodur W® was obtained in this stage.

As in Example 1, the crude product concentrated in this way to a Desmodur W® content of 14.4 wt. % was then transferred to a film evaporator (evaporator surface area 1 $m^2$) heated to 230° C., which was operated under a pressure of 0.5 mbar. At the outlet from the film evaporator a polyisocyanate resin was obtained with an NCO content of 2.90 wt. %, which contained a residual content of 1.25 wt. % of the Desmodur W® that was used.

The comparison between examples 1 and 2 shows that Desmodur W® can be separated significantly more efficiently with the microstructured evaporator than with the falling-film evaporator.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the removal of one or more volatile compounds from a reactive or unreactive mixture of substances with the aid of one or more micro-evaporators, the process comprising conveying the mixture of substances through the one or more micro-evaporators;

wherein the one or more micro-evaporators having channels for carrying the mixture of substances, the channels having a hydraulic diameter of 5 to 1000 μm and a specific evaporator surface area of at least $10^3$ m$^2$/m$^3$.

2. The process according to claim 1, wherein the channels for carrying the mixture of substances in the one or more micro-evaporators have a hydraulic diameter of 30 to 500 μm.

3. The process according to claim 2, wherein the process is operated at a temperature of from −100 to 500° C.

4. The process according to claim 2, wherein the process is operated at a temperature of from 0 to 400° C.

5. The process according to claim 2, wherein the process is operated at a temperature of from 50 to 250° C.

6. The process according to claim 1, wherein the one or more micro-evaporators have channels for carrying the heating medium, the channels for carrying a heating medium having a hydraulic diameter of from 5 to 1000 μm.

7. The process according to claim 6, wherein the process is operated at a temperature of from −100 to 500° C.

8. The process according to claim 6, wherein the process is operated at a temperature of from 0 to 400° C.

9. The process according to claim 6, wherein the process is operated at a temperature of from 50 to 250° C.

10. The process according to claim 1, wherein the process is operated at a temperature of from −100 to 500° C.

11. The process according to claim 1, wherein the process is operated at a pressure of from 0 to 100 bar.

12. The process according to claim 1, wherein the process has a residence time of from 0.001 to 60 s.

13. The process according to claim 1, wherein the mixture of substances contains at least one polyisocyanate, and at least one monomeric diisocyanate is removed from the mixture of substances.

14. The process according to claim 1, wherein the one or more micro-evaporators have further channels for carrying a heating medium, the channels having a hydraulic diameter of from 30 to 500 μm.

15. The process according to claim 1, wherein the process is operated at a temperature of from 0 to 400° C.

16. The process according to claim 1, wherein the process is operated at a temperature of from 50 to 250° C.

17. The process according to claim 1, wherein the process is operated at a pressure of from 0 to 10 bar.

18. The process according to claim 1, wherein the process is operated at a pressure of from 0 to 1 bar.

19. The process according to claim 1, wherein the process has a residence time of from 0.01 to 10 s.

* * * * *

UNITED STATES PATENT AND TRADEMARK OFFICE
CERTIFICATE OF CORRECTION

PATENT NO. : 7,442,277 B2  Page 1 of 1
APPLICATION NO. : 10/897854
DATED : October 28, 2008
INVENTOR(S) : Kurt-Manfred Kupper et al.

It is certified that error appears in the above-identified patent and that said Letters Patent is hereby corrected as shown below:

On title page, item 73 Assignee,
replace "Bayer MaterialScience LLC"
with "Bayer MaterialScience AG."

Signed and Sealed this

Ninth Day of March, 2010

David J. Kappos
*Director of the United States Patent and Trademark Office*